United States Patent
Zhang et al.

(10) Patent No.: US 8,731,399 B2
(45) Date of Patent: May 20, 2014

(54) POWER SAVING METHOD, SYSTEM AND OPTICAL NETWORK UNIT IN PASSIVE OPTICAL NETWORK

(75) Inventors: Weiliang Zhang, Guangdong Province (CN); Dan Geng, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 9 days.

(21) Appl. No.: 13/258,450

(22) PCT Filed: Jun. 25, 2010

(86) PCT No.: PCT/CN2010/074496
§ 371 (c)(1),
(2), (4) Date: Dec. 29, 2011

(87) PCT Pub. No.: WO2010/149078
PCT Pub. Date: Dec. 29, 2010

(65) Prior Publication Data
US 2012/0275790 A1 Nov. 1, 2012

(30) Foreign Application Priority Data
Dec. 30, 2009 (CN) .......................... 2009 1 0261735

(51) Int. Cl.
*H04B 10/08* (2006.01)
*H04J 14/00* (2006.01)

(52) U.S. Cl.
USPC .............................................. 398/15; 398/66

(58) Field of Classification Search
USPC .......................... 398/15, 58, 9, 10, 38, 66–67
See application file for complete search history.

(56) References Cited

U.S. PATENT DOCUMENTS

| | | | |
|---|---|---|---|
| 5,303,234 A * | 4/1994 | Kou | 370/442 |
| 5,523,868 A * | 6/1996 | Hawley | 398/38 |
| 6,636,527 B1 * | 10/2003 | Lee et al. | 370/465 |
| 7,287,175 B2 * | 10/2007 | Vereen et al. | 713/323 |
| 7,376,136 B2 * | 5/2008 | Song et al. | 370/392 |
| 7,933,518 B2 * | 4/2011 | Li et al. | 398/22 |
| 8,204,380 B2 * | 6/2012 | Ozaki | 398/100 |

(Continued)

OTHER PUBLICATIONS

GPON power Conservation, May 2009, ITUT-T Series G: Supplement 45, pp. 5-37.*

(Continued)

*Primary Examiner* — Ken Vanderpuye
*Assistant Examiner* — Dibson Sanchez
(74) *Attorney, Agent, or Firm* — Ling Wu; Stephen Yang; Ling and Yang Intellectual Property

(57) ABSTRACT

A power saving method in a passive optical network, including: when receiving an upstream burst timeslot allocated by the Optical Line Terminal (OLT) after a power supply of the Optical Network Unit (ONU) is turned off, the ONU dividing the upstream burst timeslot into one or more upstream burst timeslots; and the ONU turning on own laser in the upstream burst timeslot belonging to the ONU, and after sending one or more emergent Physical Layer Operations, Administration and Maintenance (PLOAM) messages to OLT in each upstream burst timeslot, promptly turning off the own laser. A power saving system in a passive optical network and an optical network unit is provided. The invention can decrease the power supply volume of an electric supply installation in a power-off ONU and reduce the cost of the electric supply installation.

17 Claims, 1 Drawing Sheet

(56) References Cited

U.S. PATENT DOCUMENTS

| | | | |
|---|---|---|---|
| 8,275,261 B2* | 9/2012 | Mandin et al. | 398/72 |
| 8,355,629 B2* | 1/2013 | Mahony et al. | 398/17 |
| 2002/0051455 A1* | 5/2002 | Lee et al. | 370/395.21 |
| 2006/0029398 A1* | 2/2006 | Liu et al. | 398/188 |
| 2007/0028122 A1* | 2/2007 | Chuang | 713/300 |
| 2007/0142098 A1* | 6/2007 | Behzad et al. | 455/574 |
| 2008/0195881 A1* | 8/2008 | Bernard et al. | 713/340 |
| 2008/0240714 A1* | 10/2008 | Tsukahara | 398/22 |
| 2008/0304823 A1* | 12/2008 | Mahony et al. | 398/13 |
| 2008/0304825 A1* | 12/2008 | Mahony et al. | 398/38 |
| 2009/0263127 A1* | 10/2009 | Haran et al. | 398/38 |
| 2010/0080558 A1* | 4/2010 | Kazawa et al. | 398/66 |
| 2010/0110952 A1* | 5/2010 | Diab | 370/311 |
| 2010/0111523 A1* | 5/2010 | Hirth et al. | 398/25 |
| 2010/0215359 A1* | 8/2010 | Li et al. | 398/22 |
| 2010/0260497 A1* | 10/2010 | Yoon et al. | 398/38 |
| 2010/0272433 A1* | 10/2010 | Shaffer et al. | 398/17 |
| 2012/0106958 A1* | 5/2012 | Sakamoto et al. | 398/58 |
| 2012/0148246 A1* | 6/2012 | Mukai et al. | 398/58 |

OTHER PUBLICATIONS

A broadband optical access system with increased service capability using dynamic bandwidth assignment, Nov. 2001, ITUT G.983.4, pp. 25-47.*

Gigabit-capable Passive Optical Networks (GPON): Transmission convergence layerspecification, Mar. 2008, ITUT G.984.3.*

International Search Report for PCT/CN2010/074496 dated Sep. 20, 2010.

* cited by examiner

POWER SAVING METHOD, SYSTEM AND OPTICAL NETWORK UNIT IN PASSIVE OPTICAL NETWORK

TECHNICAL FIELD

The invention relates to the field of communication technology, particularly, to a power saving method and system in a passive optical network, and an optical network unit.

BACKGROUND OF THE RELATED ART

A Gigabit-Capable Passive Optical Network (GPON) technology is an important technical branch of the passive optical network (PON) family, and similar to other PON technologies, the GPON is also a passive optical access technology employing a point to multipoint topological structure.

The GPON is composed of an Optical Line Terminal (OLT) of a network side, an Optical Network Unit (ONU) of a user side, and an Optical Distribution Network (ODN), which generally employs a point to multipoint network structure. The ODN is composed of a single mode fiber, an optical splitter and an optical connector, and used to provide an optical transmission medium for the physical connection between the OLT and the ONU.

In order to realize a part of management functions to the ONU by the OLT, ITU-T G.984.3 standards defines a Physical Layer Operations, Administration and Maintenance (PLOAM) channel, and the GPON utilizes the PLOAM channel to transmit a PLOAM message, so as to realize the management for a transmission convergence layer, including an ONU activation, establishment of an ONU management control channel, an encryption configuration and a key management, etc. The PLOAM message is transmitted in an upstream frame (the frame sent from the ONU to the OLT) and a downstream frame (the frame sent from the OLT to the ONU), each downstream frame includes one PLOAM message, and the OLT determines whether the PLOAM message is included in the upstream frame. The GPON defines that the number of downstream PLOAM (Physical layer Operations, Administration and Maintenance downstream, shorten for PLOAMd) messages which are sent from the OLT to the ONU is 18, and the number of upstream PLOAM (Physical layer Operations, Administration and Maintenance upstream, shorten for PLOAMu) messages which are sent from the ONU to the OLT is 9. The name of one upstream PLOAM message sent from the ONU to the OLT is Dying_Gasp, and the production and function of that PLOAM message are: when the ONU is power off normally and receives an upstream burst timeslot (in which, the upstream burst timeslot is used for the ONU to send the upstream data) allocated by the OLT, the ONU turns on its own laser in the upstream burst timeslot that belongs to itself, and the ONU sends one Dying_Gasp message to the OLT to inform the OLT that the ONU itself has been power off normally, so as to prevent the OLT from sending an unnecessary alarm report. The ONU needs to wait for three burst timeslots allocated by the OLT after the power supply of the ONU is turned off, the ONU turns on its own laser in each burst timeslot, sends one Dying_Gasp message and sends GPON Encapsulation Method (GEM) frame in the residual bandwidth of the current burst timeslot (if the ONU has no effective data to be sent in the residual bandwidth, then the ONU sends an idle frame to the OLT), and the ONU turns off it own laser when the upstream burst timeslot belonged to itself ends. It requires that, after the ONU turns off the power supply, an electric supply installation of the ONU can support the ONU to finish the transmission of the above data, which needs a higher requirement to the electric supply installation and increases the cost of the ONU.

The existing related technologies do not provide a method to solve the problem mentioned above.

SUMMARY OF THE INVENTION

The technical problem to be solved in the present invention is to provide a power saving method and system in a passive optical network, and an optical network unit to reduce the requirement to the electric supply installation of the ONU and reduce the cost of the ONU.

In order to solve the above problem, the present invention provides a power saving method in a passive optical network, comprising: when an optical network unit (ONU) receives an upstream burst timeslot allocated by an optical line terminal (OLT) after a power supply of the ONU is turned off, the ONU dividing the upstream burst timeslot into one or more upstream burst timeslots; and the ONU turning on own laser in the upstream burst timeslot belonging to the ONU, and after sending one or more emergent physical layer operations, administration and maintenance (PLOAM) messages in each upstream burst timeslot, promptly turning off the own laser.

The emergent PLOAM message is a Dying_Gasp message.

The method further comprises: after receiving the emergent PLOAM message sent by the ONU, the OLT stopping allocating the upstream burst timeslot to the ONU.

The method further comprises: after receiving the emergent PLOAM message, the OLT allocating one or more upstream burst timeslots to the ONU continually; and the ONU dividing each upstream burst timeslot allocated continually by the OLT into one or more upstream burst timeslots, turning on the own laser in the upstream burst timeslot belonging to the ONU, and after sending one or more emergent PLOAM messages in each upstream burst timeslot, promptly turning off the own laser.

A plurality of emergent PLOAM messages sent from the ONU to the OLT is identical or different.

The present invention further provides a power saving system in a passive optical network, comprising an Optical Network Unit (ONU) and an Optical Line Terminal (OLT), wherein:

the ONU is configured to: when receiving an upstream burst timeslot allocated by the OLT after a power supply of the ONU is turned off, divide the upstream burst timeslot into one or more upstream burst timeslots, turn on own laser in the upstream burst timeslot belonging to the ONU, and after sending an emergent physical layer operations, administration and maintenance (PLOAM) message in each upstream burst timeslot, promptly turn off the own laser.

The emergent PLOAM message is a Dying_Gasp message.

The OLT is configured to: after receiving the emergent PLOAM message sent by the ONU, stop allocating the upstream burst timeslot to the ONU.

The OLT is configured to: after receiving the emergent PLOAM message, allocate one or more upstream burst timeslots to the ONU continually; and the ONU is further configured to: divide each upstream burst timeslot allocated continually by the OLT into one or more upstream burst timeslots, turn on the own laser in the upstream burst timeslot belonging to the ONU, and after sending one or more emergent PLOAM messages in each upstream burst timeslot, promptly turn off the own laser.

A plurality of emergent PLOAM messages sent by the ONU is identical or different.

The present invention further provides an ONU, comprising:

an upstream burst timeslot receiving module, which is configured to: receive an upstream burst timeslot allocated by an optical line terminal (OLT) after a power supply of the ONU is turned off, and trigger a timeslot division module;

the timeslot division module, which is configured to: when receiving the upstream burst timeslot allocated by the OLT, divide the upstream burst timeslot into one or more upstream burst timeslots, and send to an emergent message sending module; and the emergent message sending module, which is configured to: turn on own laser in the upstream burst timeslot belonging to the ONU, and after sending an emergent physical layer operations, administration and maintenance (PLOAM) message in each upstream burst timeslot, promptly turn off the own laser.

The emergent PLOAM message is a Dying_Gasp message.

The upstream burst timeslot receiving module is further configured to: receive one or more upstream burst timeslots allocated continually to the ONU by the OLT after the OLT receives the emergent PLOAM message, and trigger the timeslot division module;

the timeslot division module is further configured to: divide each upstream burst timeslot allocated continually by the OLT into one or more upstream burst timeslots, and send to the emergent message sending module.

A plurality of emergent PLOAM messages is identical or different.

The method of the ONU sending the emergent PLOAM message(s) after a power supply of the ONU is turned off provided in the present invention, promptly turns off the laser after sending the emergent PLOAM message(s) in the upstream burst timeslot, without sending the data frame or the idle frame in the residual bandwidth of the upstream burst timeslot, thereby decreasing the power supply volume of the electric supply installation of the ONU whose power supply is turned off and reducing the cost of the electric supply installation.

PREFERRED EMBODIMENTS OF THE PRESENT INVENTION

The core idea of the present invention is that, when receiving an upstream burst timeslot allocated by the OLT after a power supply of the ONU is turned off, the ONU promptly turns off a laser of the ONU after sending the emergent PLOAM message(s) in the upstream burst timeslot, so as to achieve the purpose of power saving.

Figure 1:
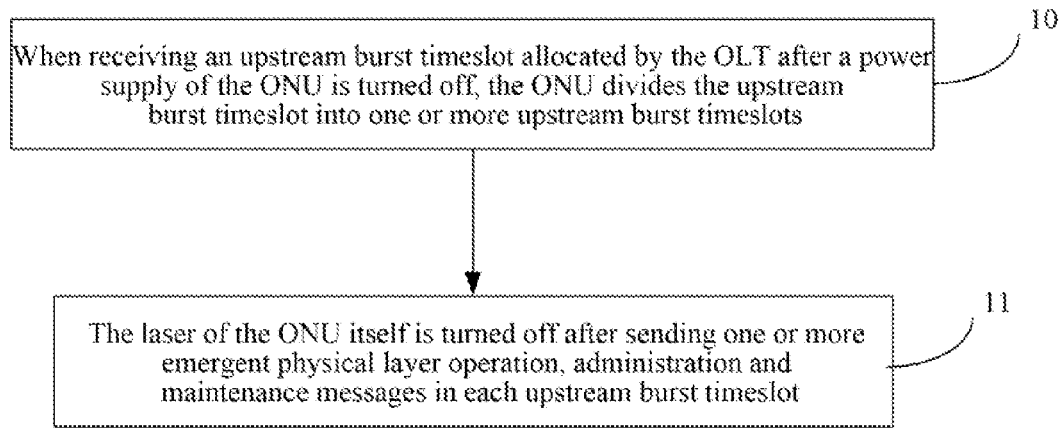
FIG. 1: a flow chart of a power saving method in a passive optical network according to an embodiment of the present invention.

The power saving method in the passive optical network provided in the present invention is shown in FIG. 1, which comprises:

step 10: when receiving an upstream burst timeslot allocated by the OLT after a power supply of the ONU is turned off, the ONU divides the upstream burst timeslot into one or more upstream burst timeslots;

step 11: the laser of the ONU itself is promptly turned off after the ONU sends one or more emergent PLOAM messages in each upstream burst timeslot.

There are two modes to send the emergent PLOAM message(s):

one is to promptly turn off the own laser after sending one or more emergent upstream PLOAM messages directly in the upstream burst timeslot;

one is to divide the upstream burst timeslot into a plurality of upstream burst timeslots, then promptly turn off the own laser after sending one or more emergent upstream PLOAM messages in each upstream burst timeslot.

Wherein, the emergent upstream PLOAM message can be a Dying_Gasp message or other emergent upstream PLOAM messages.

Wherein, after receiving the above emergent PLOAM message(s) sent by the ONU, the OLT can stop allocating the upstream burst timeslot to the ONU; or, after receiving the above emergent PLOAM message(s) sent by the ONU, the OLT can allocate one or more upstream burst timeslots to the ONU continually, and the ONU divides each upstream burst timeslot allocated continually by the OLT into one or more upstream burst timeslots, and promptly turns off the own laser after sending one or more emergent physical layer operations, administration and maintenance (PLOAM) messages in each upstream burst timeslot.

Specifically, the OLT and the ONU can employ one of the following four modes to transmit the emergent upstream PLOAM message(s):

mode 1: when receiving the upstream burst timeslot allocated by the OLT after the power supply of the ONU is turned off, the ONU promptly turns off the own laser after sending a plurality of emergent upstream PLOAM messages.

Mode 2: when receiving the upstream burst timeslot allocated by the OLT after the power supply of the ONU is turned off, the ONU divides the upstream burst timeslot into a plurality of upstream burst timeslots, and promptly turns off the laser after sending one emergent PLOAM message in each upstream burst timeslot.

Mode 3: when receiving the upstream burst timeslot allocated by the OLT after the power supply of the ONU is turned off, the ONU divides the upstream burst timeslot into a plurality of upstream burst timeslots, and promptly turns off the laser after sending a plurality of emergent PLOAM messages in each upstream burst timeslot.

Mode 4: when receiving the upstream burst timeslot allocated by the OLT after the power supply of the ONU is turned off, the ONU promptly turns off the own laser after sending one emergent upstream PLOAM message. After receiving the above emergent PLOAM message sent by the ONU, the OLT allocates one or more upstream burst timeslots to the ONU continually, the ONU promptly turns off the laser after sending the emergent PLOAM message continually in each upstream burst timeslot allocated by the OLT.

The emergent PLOAM messages sent by the ONU time after time can be identical or different.

In the case of no conflicts, the embodiments and the characteristics of the embodiments in the present application can be combined with each other.

Embodiment One

In a GPON system, the step of the ONU sending a Dying_Gasp message comprises the steps as following:

step 101, turn off the power supply of the ONU;

step 102, the OLT allocates the upstream burst timeslot to the ONU for sending upstream data;

step 103, when receiving the upstream burst timeslot allocated to the ONU by the OLT, the ONU, the power supply of which is turned off, promptly turns off the laser after sending one or more Dying_Gasp messages in the upstream burst timeslot belonging to the ONU;

step 104, repeat the step 102 and step 103 twice, repeating twice here is only an example, and the repeat times can be selected according to need or the process ends directly without repeating.

The embodiment can be used for the ONU sending the Dying_Gasp message, and also can be used for the ONU sending other emergent messages.

Embodiment Two

In a GPON system, the step of the ONU sending a Dying_Gasp message is as following:

step 201, turn off the power supply of the ONU.

Step 202, the OLT allocates the upstream burst timeslot for sending upstream data to the ONU.

Step 203, when receiving the upstream burst timeslot allocated to the ONU by the OLT, the ONU, the power supply of which is turned off, promptly turns off the laser after continuously sending three (the number "three" here is only an example, the number can be other numerical values) Dying_Gasp messages in the upstream burst timeslot belonging to the ONU.

Step 204, after receiving the Dying_Gasp messages sent by the ONU in the step 203, the OLT stops allocating the upstream burst timeslot to the ONU.

The embodiment can be used for the ONU sending the Dying_Gasp message, and also can be used for the ONU sending other emergent messages; and in the embodiment, the ONU sends three identical Dying_Gasp messages in the burst timeslot belonging to the ONU itself, and the ONU can also send different emergent PLOAM messages in the burst timeslot belonging to itself.

Embodiment Three

In a GPON system, the step of the ONU sending a Dying_Gasp message is as following:

step 301, turn off the power supply of the ONU.

Step 302, the OLT allocates the upstream burst timeslot used for sending upstream data to the ONU.

Step 303, when receiving the upstream burst timeslot allocated to the ONU by the OLT, the ONU, the power supply of which is turned off, divides the one upstream burst timeslot into a plurality of upstream burst timeslots, and promptly turns off the laser after sending one or more Dying_Gasp messages in each upstream burst timeslot.

Step 304, after receiving the Dying_Gasp message(s) sent by the ONU in step 303, the OLT stops allocating the upstream burst timeslot to the ONU.

The embodiment can be used for the ONU sending the Dying_Gasp message, and also can be used for the ONU sending other emergent messages; and in the embodiment, the ONU sends three identical Dying_Gasp messages in the burst timeslot belonging to the ONU itself, and the ONU can also send different emergent PLOAM messages in the burst timeslot belonging to itself.

Embodiment Four

In a GPON system, the step of the ONU sending a Dying_Gasp message is as following:

step 401, turn off the power supply of the ONU.

Step 402, the OLT allocates the upstream burst timeslot used for sending upstream data to the ONU.

Step 403, when receiving the upstream burst timeslot allocated to the ONU by the OLT, the ONU, the power supply of which is turned off, divides the one upstream burst timeslot into a plurality of upstream burst timeslots, and promptly turns off the laser after sending one or more Dying_Gasp messages in each upstream burst timeslot.

Step 404, repeat the step 402 and step 403 twice, repeating twice here is only an example, and it can be other repeat times.

The embodiment can be used for the ONU sending the Dying_Gasp message, and also can be used for the ONU sending other emergent messages; and in the embodiment, the ONU sends three identical Dying_Gasp messages in the burst timeslot belonging to the ONU itself, and the ONU can also send different emergent PLOAM messages in the burst timeslot belonging to itself.

The present invention further provides a power saving system in a passive optical network, comprising an Optical Network Unit (ONU) and an Optical Line Terminal (OLT), wherein:

The ONU is configured to: when receiving an upstream burst timeslot allocated by the OLT after a power supply of the ONU is turned off, divide the upstream burst timeslot into one or more upstream burst timeslots, turn on own laser in the upstream burst timeslot belonging to the ONU, and after sending emergent Physical Layer Operations, Administration and Maintenance (PLOAM) message(s) in each upstream burst timeslot, promptly turn off the own laser.

Wherein, the emergent PLOAM message can be a Dying_Gasp message.

The OLT is configured to: after receiving the emergent PLOAM message sent by the ONU, stop allocating the upstream burst timeslot to the ONU.

Or, the OLT is configured to: after receiving the emergent PLOAM message, allocate one or more upstream burst timeslots to the ONU continually;

the ONU is further configured to: divide each upstream burst timeslot allocated continually by the OLT into one or more upstream burst timeslots, turn on the own laser in the upstream burst timeslot belonging to the ONU, and after sending one or more emergent PLOAM messages in each upstream burst timeslot, promptly turn off the own laser.

Wherein, the ONU can be configured to send a plurality of identical or different emergent PLOAM messages to the OLT.

Figure 2:
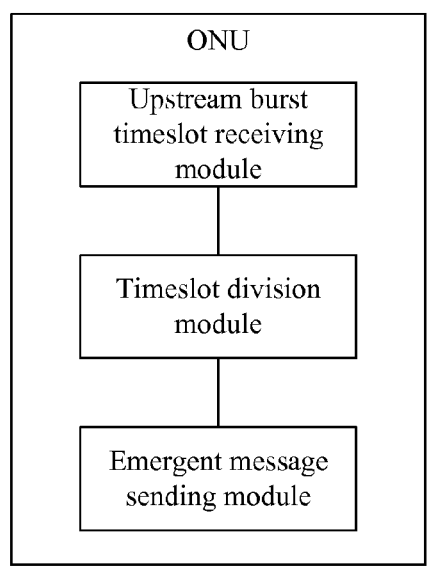
FIG. 2: a structural schematic diagram of an ONU according to an embodiment of the present invention.

The present invention further provides an ONU, as shown in FIG. 2, comprising:

an upstream burst timeslot receiving module 20, which is configured to: receive an upstream burst timeslot allocated by the OLT after a power supply of the ONU is turned off, and trigger an timeslot division module;

the timeslot division module 21, which is configured to: when receiving the upstream burst timeslot allocated by the OLT, divide the upstream burst timeslot into one or more upstream burst timeslots, and send to an emergent message sending module; and the emergent message sending module 22, which is configured to: turn on own laser in the upstream burst timeslot belonging to the ONU, and after sending an emergent Physical Layer Operations, Administration and Maintenance (PLOAM) messages in each upstream burst timeslot, promptly turn off the own laser.

The upstream burst timeslot receiving module is further configured to: receive one or more upstream burst timeslots allocated continually to the ONU by the OLT after the OLT receives the emergent PLOAM message, and trigger the timeslot division module;

the timeslot division module is further configured to: divide each upstream burst timeslot allocated continually by the OLT into one or more upstream burst timeslots, and send to the emergent message sending module.

A plurality of emergent PLOAM messages is identical or different.

It is noteworthy that, the method of sending the emergent PLOAM message(s) provided in the present invention is also applicable to the next generation PON system based on the GPON.

The skilled in the art can understand that all or part of the steps in the above methods can be accomplished through instructing the related hardware by programs, and the programs can be stored in a computer readable storage medium, such as a read-only memory (ROM), a magnetic disk or a compact disc. Alternatively, all or part of the steps in the above embodiments can also be realized by using one or more integrated circuits. Accordingly, each module/unit in the above embodiments can be realized by a form of hardware, and it also can be realized by a form of software function module. The present invention is not limited to any particular form of the combination of hardware and software.

INDUSTRIAL APPLICABILITY

The invention promptly turns off the laser after sending the emergent PLOAM message(s) in the upstream burst timeslot, without sending the data frame or the idle frame in the residual bandwidth of the upstream burst timeslot, thereby decreasing the power supply volume of the electric supply installation of the ONU whose power supply is turned off and reducing the cost of the electric supply installation.

What we claim is:

1. A power saving method in a passive optical network, comprising:
   when a power supply of an optical network unit (ONU) is turned off and the ONU which is still supported by an electric power stored in a power unit receives an upstream burst timeslot allocated by an optical line terminal (OLT), the ONU dividing the upstream burst timeslot into one or more upstream burst timeslots; and
   when the upstream burst timeslot is still one upstream burst timeslot, the ONU turning on its own laser unit in said one upstream burst timeslot of the ONU, sending one or more emergent physical layer operations, administration and maintenance (PLOAM) messages in said one upstream burst timeslot without sending data frame or idle frame in the residual bandwidth of the upstream burst timeslot, and immediately turning off its own laser unit after sending said one or more emergent PLOAM messages;
   when the upstream burst timeslot is divided into two or more upstream burst timeslots, the ONU turning on its own laser unit in each upstream burst timeslot of the ONU, sending one or more emergent PLOAM messages in said each upstream burst timeslot without sending data frame or idle frame in the residual bandwidth of the upstream burst timeslot, and immediately turning off its own laser unit after sending said one or more emergent PLOAM messages;
   thereby decreasing the usage volume of the electric power stored in the power unit for supporting the ONU completing the procedure of transmitting the emergent PLOAM messages.

2. The method according to claim 1, wherein, the emergent PLOAM message is a Dying_Gasp message.

3. The method according to claim 1, further comprising:
   after receiving the emergent PLOAM message sent by the ONU, the OLT stopping allocating the upstream burst timeslot to the ONU.

4. The method according to claim 3, wherein, a plurality of emergent PLOAM messages sent from the ONU to the OLT is identical or different.

5. The method according to claim 1, further comprising:
   after receiving the emergent PLOAM message(s), the OLT allocating upstream burst timeslot(s) to the ONU continually.

6. The method according to claim 5, wherein, a plurality of emergent PLOAM messages sent from the ONU to the OLT is identical or different.

7. The method according to claim 1, wherein, a plurality of emergent PLOAM messages sent from the ONU to the OLT is identical or different.

8. A power saving system in a passive optical network, comprising an optical network unit (ONU) and an optical line terminal (OLT), wherein:
   the ONU is configured to: when a power supply of the ONU is turned off and the ONU is still supported by an electric power stored in a power unit, receive an upstream burst timeslot allocated by the OLT divide the upstream burst timeslot into one or more upstream burst timeslots; and
   when the upstream burst timeslot is still one upstream burst timeslot, turn on its own laser unit in said one upstream burst timeslot of the ONU, send one or more emergent physical layer operations, administration and maintenance (PLOAM) messages in said one upstream burst timeslot without sending data frame or idle frame in the residual bandwidth of the upstream burst timeslot, and immediately turn off its own laser unit after sending said one or more emergent PLOAM messages;
   when the upstream burst timeslot is divided into two or more upstream burst timeslots, turn on its own laser unit in each upstream burst timeslot of the ONU, send one or more emergent PLOAM messages in said each upstream burst timeslot without sending data frame or idle flame in the residual bandwidth of each upstream burst timeslot, and immediately turn off its own laser unit after sending said one or more emergent PLOAM messages;
   thereby decreasing the usage volume of the electric power stored in the power unit for supporting the ONU completing the procedure of transmitting the emergent PLOAM messages.

9. The system according to claim 8, wherein, the emergent PLOAM message is a Dying_Gasp message.

10. The system according to claim 8, wherein:
    the OLT is configured to: after receiving the emergent PLOAM message(s) sent by the ONU, stop allocating the upstream burst timeslot to the ONU.

11. The system according to claim 10, wherein, a plurality of emergent PLOAM messages sent by the ONU is identical or different.

12. The system according to claim 8, wherein:
    the OLT is configured to: after receiving the emergent PLOAM message(s), allocate upstream burst timeslot(s) to the ONU continually.

13. The system according to claim 12, wherein, a plurality of emergent PLOAM messages sent by the ONU is identical or different.

14. The system according to claim 8, wherein, a plurality of emergent PLOAM messages sent by the ONU is identical or different.

15. An optical network unit (ONU) comprising:
an upstream burst timeslot receiving module, which is configured to: when a power supply of the ONU is turned off and the ONU is still supported by an electric power stored in a power unit, receive an upstream burst timeslot allocated by an optical line terminal (OLT), and trigger a timeslot division module;
the timeslot division module, which is configured to: when receiving the upstream burst timeslot allocated by the OLT, divide the upstream burst timeslot into one or more upstream burst timeslots, and send to an emergent message sending module; and
the emergent message sending module, which is configured to:
when the upstream burst timeslot is still one upstream burst timeslot, turn on its own laser unit in said one upstream burst timeslot of the ONU, and send one or more emergent physical layer operations, administration and maintenance (PLOAM) messages in said one upstream burst timeslot without sending data frame or idle frame in the residual bandwidth of the upstream burst timeslot, and immediately turn off its own laser unit after sending said one or more emergent PLOAM messages;
when the upstream burst timeslot is divided into two or more upstream burst timeslots, turn on its own laser unit in each upstream burst timeslot of the ONU, send one or more emergent PLOAM messages in said each upstream burst timeslot without sending data frame or idle frame in the residual bandwidth of each upstream burst timeslot, and immediately turn off its own laser unit after sending said one or more emergent PLOAM messages;
thereby decreasing the usage volume of the electric power stored in the power unit for supporting the ONU completing the procedure of transmitting the emergent PLOAM messages.

16. The ONU according to claim 15, wherein, the emergent PLOAM message is a Dying_Gasp message.

17. The ONU according to claim 15, wherein, a plurality of emergent PLOAM messages is identical or different.

* * * * *